United States Patent
Bradley

[15] 3,650,340
[45] Mar. 21, 1972

[54] STRAIN GAGE WEIGHING DEVICE

[72] Inventor: Richard S. Bradley, Upper Saddle River, N.J.

[73] Assignee: Art's-Way Manufacturing Company Incorporated, Armstrong, Iowa

[22] Filed: July 2, 1969

[21] Appl. No.: 838,438

[52] U.S. Cl. ............................................ 177/136, 177/211
[51] Int. Cl. ............................................... G01g 19/08
[58] Field of Search .................. 177/136, 139, 140, 211; 73/141 A

[56] References Cited

UNITED STATES PATENTS

| | | | |
|---|---|---|---|
| 3,273,382 | 9/1966 | Fonash | 177/136 X |
| 3,283,838 | 11/1966 | Fetterman et al. | 177/211 X |
| 3,439,761 | 4/1969 | Laimins | 177/211 |
| 3,443,652 | 5/1969 | Videon | 177/211 X |
| 3,499,500 | 3/1970 | Harding | 177/211 X |

FOREIGN PATENTS OR APPLICATIONS

| | | | |
|---|---|---|---|
| 859,630 | 1/1961 | Great Britain | 177/211 |

*Primary Examiner*—Stephen J. Tomsky
*Assistant Examiner*—George H. Miller, Jr.
*Attorney*—Williamson, Palmatier & Bains

[57] ABSTRACT

An electromechanical weight-measuring system for weighing successive and cumulative loads deposited in a load-receiving medium which utilizes one or more cantilevered, resilient or elastic deformable elements. Supporting the load-receiving medium are one, or preferably a plurality of crucial load points, wherein the cantilevered elements are interposed between the receiving medium and ground or other supporting base; pairs of strain gage sensing elements are mounted on and under each of the cantilevered elements. The sensing elements can be a variable resistance type connected together to form a bridge circuit, coupled to amplifying means and an indicating device for the measurement of the magnitude of bridge unbalance.

13 Claims, 9 Drawing Figures

Patented March 21, 1972

INVENTOR.
RICHARD S. BRADLEY
BY Williamson, Palmatier & Bains

ATTORNEYS

Patented March 21, 1972 3,650,340

INVENTOR.
RICHARD S. BRADLEY
BY Williamson, Palmatier, Bains
ATTORNEYS

INVENTOR.
RICHARD S. BRADLEY

BY
Williamson, Palmatier + Baine

ATTORNEYS

3,650,340

STRAIN GAGE WEIGHING DEVICE

This invention relates to systems and devices for accurately weighing successive and cumulative loads deposited in a material-receiving medium, container, or hopper, which is supported at one or more load points, and more particularly this invention relates to devices and systems used for weighing utilizing resistance type strain gages as sensors which are bonded to load bearing elements of a resilient, cantilevered type, and is particularly applicable to storage type material-receiving media, as well as vehicular mounted storage and mixing containers.

BACKGROUND OF THE INVENTION

The apparatus of this invention was developed specifically to meet the needs of the farming industry. In meeting the difficult requirements of this market the device also meets the less critical needs of many other applications.

A primary need of the farmer is for a low cost weight measuring device which may be factory or field installed on portable grain feed mixers and mills. The device has to be capable of operation from nominal 12 v. DC automotive type electrical systems. Feed mixes often contain relatively small proportions of antibiotics and vitamins. Therefore, the apparatus must be capable of accurately measuring a wide range of weights. The weighing mechanism must be rugged and capable of sustaining travel over rough terrain without damage. An unusual requirement is that accuracy of measurement be maintained on grades and uneven ground. The apparatus must be capable of operating over a temperature range of −22° to +140° F. under conditions of 100 percent humidity, since these are the typical conditions which the equipment will be subjected to in normal use.

Various weighing devices are available on the market which utilize a strain gage technique for measuring the weight or amount of material received by the material-receiving media. Certain devices presently in use contain a load cell sensing device located between the receiving container and auxiliary structures requiring the sensing device to be a main support member and frequently requiring the incorporating of duplicate structures such as an additional frame in order to provide adequate mechanical support. Modification of presently existing vehicles to incorporate a load cell weight-measuring system would be impractical. The present invention utilizes the load-bearing members of the vehicle as originally constructed and does not of itself carry any of the weight being measured and may be readily adapted to vehicles which are presently in use. Incorporating the presently described weight-measuring device to fixed storage containers also is readily achievable.

Present weighing systems are incapable of maintaining a high degree of accuracy when measuring the weight of material in a vehicle-mounted container. The terrain upon which the vehicle is mounted continually introduces an error in the reading obtained. Irregularities, such as crevices or rocks, appearing beneath the wheels cause a different fulcrum point to occur thereby introducing undesirable errors. The present invention utilizes a technique for measurement which is independent of the mounting surface upon which the vehicle or storage container rests. The present invention also provides a simple, economical and highly accurate system for electromechanically weighing successive and cumulative loads deposited in a material-receiving container which may be mounted for travel on a plurality of ground-engaging elements such as wheels, and in addition is applicable to stationary storage media such as bins and elevators where the receiving medium is supported on one or preferably a plurality of cantilevered, resilient, load-receiving elements which support the load being measured. More specifically, this invention describes a weight-measuring system which incorporates a strain gage sensing element located in each of the load points involved and is not limited to cantilever-type supports.

In the preferred embodiment, a pair of electrical resistance strain gages are embedded or affixed in each load member. A second pair of sensing strain gages is affixed to the load member a prescribed distance from the first pair, each pair having one unit mounted above and the second unit mounted below the load-bearing member in juxtaposition. The upper strain gages are capable of measuring compression and the lower strain gages measuring the tension occurring on the slightly deformed load-bearing elements. The sensors are electrically connected together to form a bridge circuit employing a null-type indicating means, suitable amplification, a means of balancing the initial or start position, a second means for successively balancing out incremental loads, and a mechanically actuated counter for indicating successive and cumulative weights of material loaded into the material-receiving medium.

The present invention utilizes microminiature integrated circuitry which, for convenience, is housed in a remotely located housing with the indicating and nulling means. It is especially adapted for use on load-carrying vehicles of various types, since the only requirement for immediate installation is a substitution of a replaceable axle and axle mounting plate without the requirement of modifying the vehicle wheels or other ground supporting means.

The object of this invention is to provide an electromechanical weight-measuring system which is readily adaptable to vehicular material-receiving mediums as well as those of the stationary type.

Another object of this invention is to provide an electromechanical weight-measuring system which is suitable for use with a vehicular mounted, material-receiving medium, and is capable of maintaining a high degree of accuracy regardless of the terrain on which the vehicle is mounted.

A further object of this invention is to provide an electromechanical weight-measuring system which is small in size, light in weight, and utilizes a remotely located indicating device which may be alternately utilized in combination with a multiplicity of load-carrying vehicles or stationary media.

A further object of this invention is to provide an electromechanical, weight-measuring system which will accurately weigh the amount of material contained in a storage media which is independent of the number of load-bearing support members.

Additional objects and advantages will be more fully understood from the following description made in connection with the accompanying drawings wherein like reference characters refer to similar parts and in which.

Figure 1:
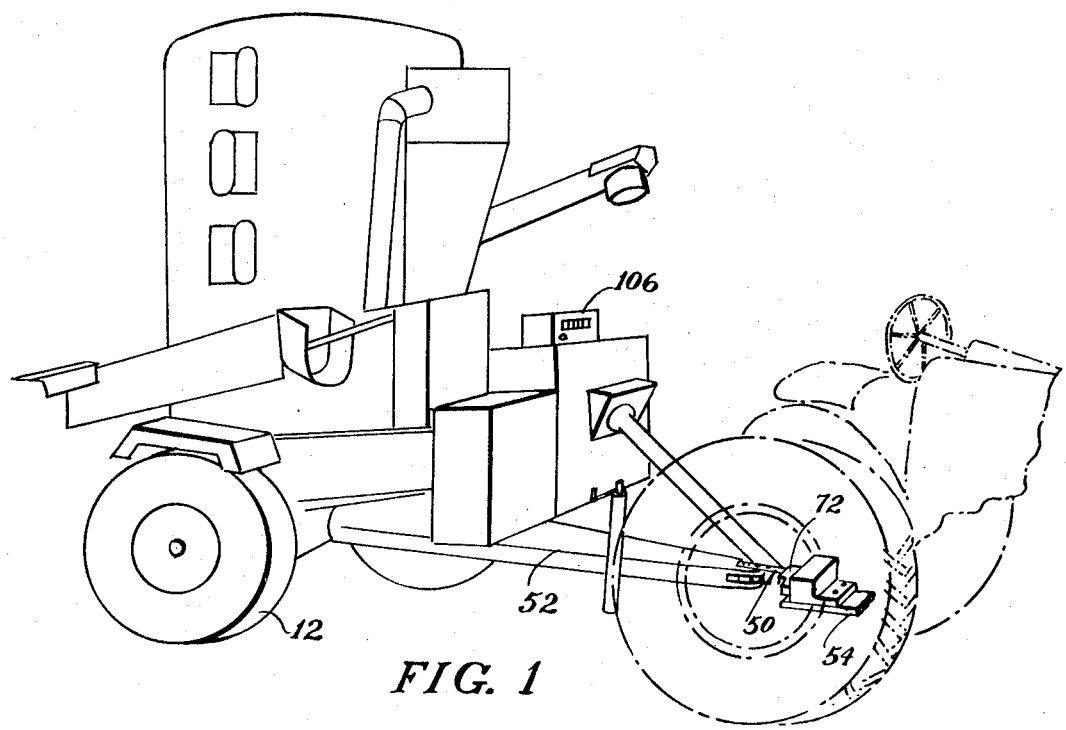
FIG. 1 is a perspective view of a typical, sulky-type feed mixer drawn by a tractor.

In FIG. 1 there is shown a perspective of a typical sulky-type two-wheel feed mixer and hopper drawn by a tractor, a portion of which is shown.

Figure 1A:
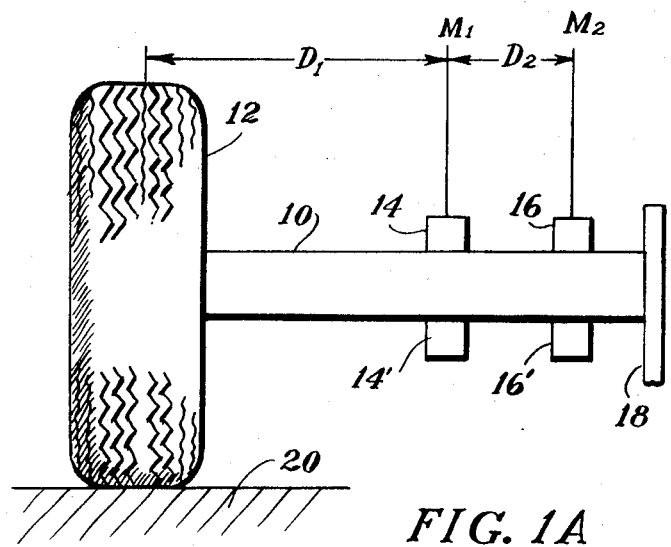
FIG. 1A is a force diagram showing the moments which occur on the cantilevered axle supporting the feed mixer of FIG. 1.

To better understand the principle of operation of my electromechanical weight-measuring system, reference is made to FIG. 1A wherein there is shown an axle 10 supported by wheel 12. Mounted on the axle are two strain gage devices 14 and 16. As FIG. 1A indicates, the load P being applied to the support plate 18 causes reaction W from the earth 20 against tire 12. The distance from strain gage 14 to the load reaction point W is to be considered $D_1$. The distance between strain gages 14 and 16 is to be considered as $D_2$. The moments caused by the reaction W about the strain gages can be computed as follows: The moment at strain gage 14 is $M_1 = W \times (D_1)$. The moment at strain gage 16 is $M_2 = W \times (D_1 \times D_2)$. The difference of the two moments between strain gages 14 and 16 is therefore $M_2 - M_1 = W \times + \times D_1 + W \times D_2 - W \times D_1$; therefore $M_2 - M_1 = W \times D_2$.

It has thus been shown that if the distance $D_2$ remains fixed, the applied load P of an object is directly proportional to the difference in the moments read at gages 16 and 14 and is independent of $D_1$. Therefore it matters not where along the axle or wheel the reaction load is exerted. This principle is applied in my strain gage weight device.

In order to increase the effective output of the strain gages and to provide temperature compensation when connected in a Wheatstone bridge, two pairs of gages are utilized rather than only two units. A first strain gage 16 and a second strain gage 14 appearing on the top of the axle 10 would be normally found to be in compression, as indicated in FIGS. 1 and 1A and therefore would be caused to have a resistance value decreasing in magnitude and directly dependent on the weight W applied.

Two additional strain gages 14' and 16' are mounted on the underside of axle 10 in juxtaposition with gages 14 and 16, respectively. Strain gages 14' and 16' will be found to be in tension when gages 14 and 16 are in compression. In order to provide the physical subtraction as the mathematics indicate, all that need be done is that strain gage 16' be connected in series with strain gage 16 in the proper arm of the bridge to obtain the correct result. This will be further explained in greater detail hereinafter.

Referring now to FIGS. 2–5 inclusive an embodiment of my invention as applied to vehicular material-receiving media such as feed mixers, farm wagons, combines, track-propelled material-receiving implements and sleds, requires a very rigid axle mounting structure 10 having, as shown, a heavy mounting plate 18 secured in a vertical position by suitable securing means such as a plurality of bolts 20 to the material-receiving medium (hopper, tank or bin) 22, of the vehicle body. Many of the farm wagons, mixers or other implements have axles which at their outer end carry rotatably ground-engaging wheels or the like. The embodiment of my structure illustrated in FIG. 2 includes an axle 10 which is rigidly welded or otherwise affixed to the plate 18, which is of heavy metallic material not readily flexible or being able to resiliently bend with the maximum weight or loads of material to be applied.

Strain gages 14 and 16 and 14' and 16' are connected by means of cable 26 to plug 28. Plug 28 is connected to the remote indicating means 106 which will be explained a little later. In the present embodiment, provisions have been made to incorporate four load-sensing points, as for example, in a four-wheel vehicle. For a two- or three-wheel vehicle where less than four points are to be utilized, a dummy sensor is used in order to effect the proper balancing of the bridge. In this manner, one or more load points may be sensed. The only requirement is that if all four sensors are not being utilized a dummy be substituted in that position. Additional sensing gages may be incorporated in the balanced bridge arrangement if it becomes necessary for a particular application.

Figure 1B:
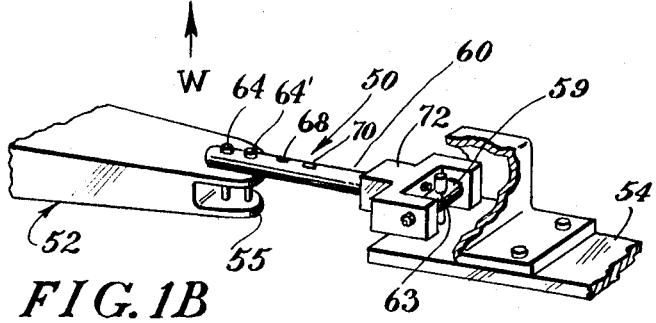
FIG. 1B is a perspective view of a load-measuring hitch for use with a sulky-type container.
Figure 2:
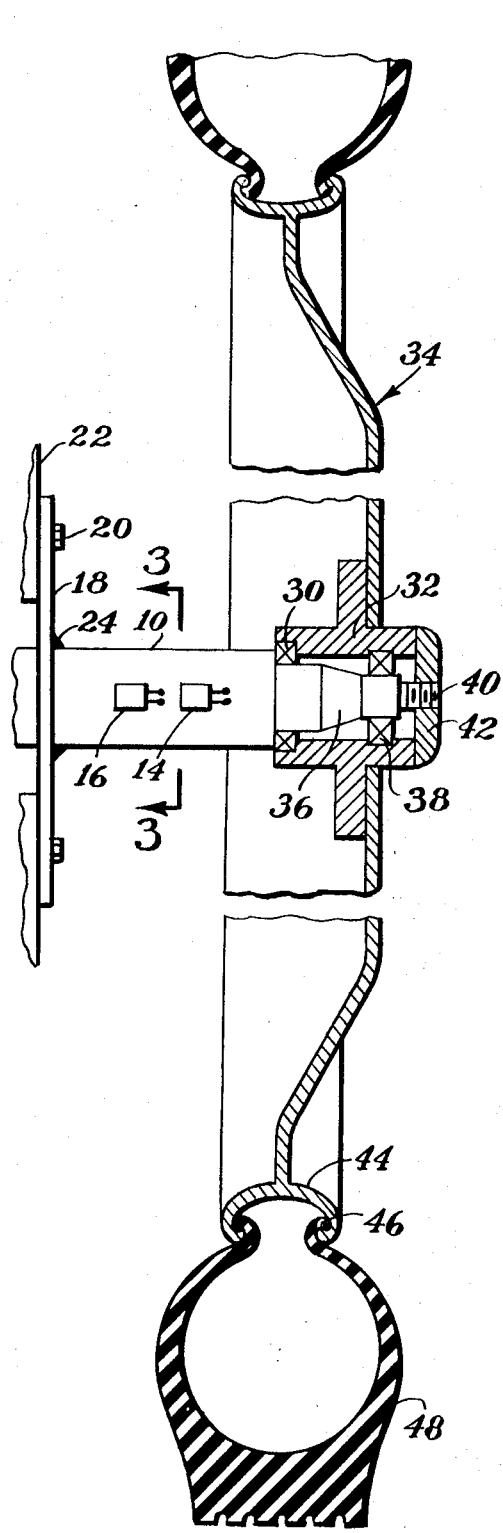
FIG. 2 is a top plan view of a substitute axle and axle support rigidly secured to a material-receiving vehicle with the wheel thereof shown in horizontal cross section and showing a pair of strain gage sensors bonded or embedded in the top portion of the axle, with the axle in cantilevered relation relative to its support and the wheel.
Figure 3:
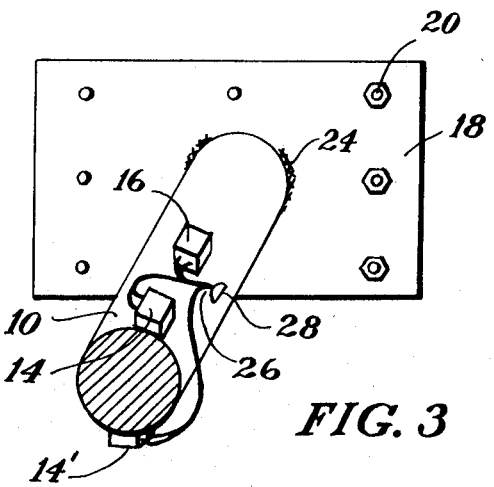
FIG. 3 is an isometric view of the axle taken along line 3—3 showing the location of the strain gages and method of attachment to the mounting plate.
Figure 4:
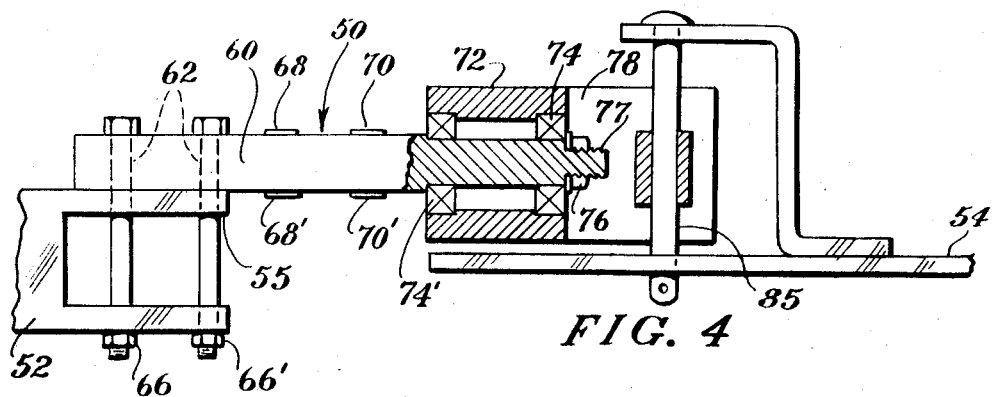
FIG. 4 is a partially sectioned side elevational view of an intermediate hitch for coupling a sulky-type two-wheel vehicle to a tractor.
Figure 5:
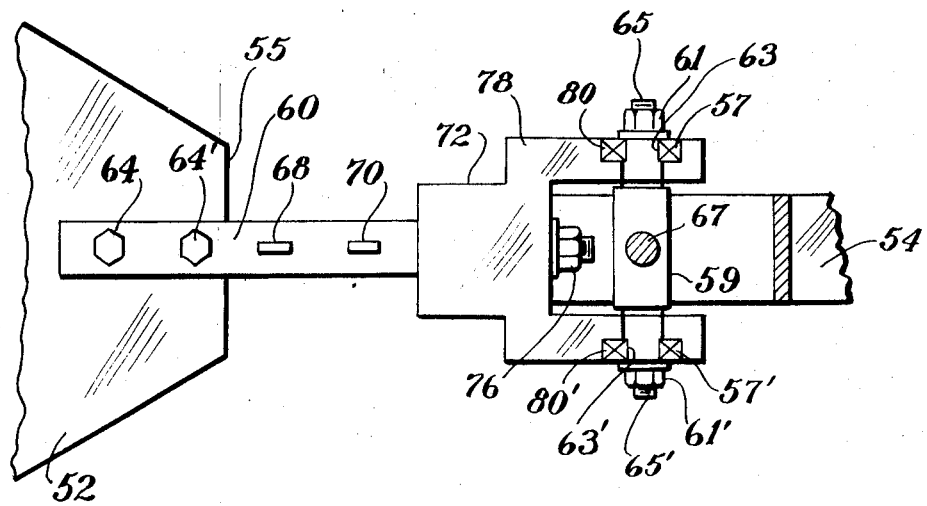
FIG. 5 is a top plan view of the intermediate hitch of FIG. 4.

The present embodiment of my invention includes the axle 10 rigidly mounted to plate 18 which constitutes the fulcrum as described earlier. Axle 10 extends from the fulcrum 18 throughout a predetermined length to a bearing 30 for rotatively receiving the hub 32 of a conventional wheel 34. The outer portion of axle 10, beyond the bearing 30, is reduced conventionally at 36 and the second bearing 38 is provided. The terminus 40 of the axle 10 is threaded for engagement with an internally threaded hub cap 42. The wheel 34 has the conventional type of rim 44 which has bead-engaging portions 46 for attachment to a conventional type of pneumatic, or otherwise inflatable tire 48. The extended portion of axle 10 beyond the fulcrum end of mounting plate 18 constitutes a cantilevered unit when the body or material-receiving medium is supported upon the wheels 48. At a predetermined area of the exposed portion of the axle 10 strain gages 14 and 16 are bonded to the axle extending essentially in a horizontal plane and having their leads, as shown in FIG. 3, attached respectively to insulated electrical conductor means of cable 26 to electrical connector 28. Similar strain gage elements 14' and 16' are bonded to the underside of the stationary axle 10 directly opposing the top strain gages 14 and 16, as shown in FIG. 1. The electrical circuitry including the four strain gages and similar and correspondingly mounted strain gages on the axially aligned and opposite supporting axle of the vehicle is illustrated in the electrical diagrams of FIGS. 6 and 7. Strain gages 14 and 16 and 14' and 16' are a commercially available unit which are manufactured by deposition and etching techniques on an insulated substrate. It will be understood that if a four-wheel vehicle or sled, or a multiwheel vehicle or track-type vehicle is provided with my electromechanical weighing system, then corresponding sets of strain gages and leads are employed for all load points. As contemplated in FIGS. 1, 2 and 3, a sulky-type vehicle is employed having two wheels 34 with special replacement axles 10 and mounting plates 18 axially aligned on the vehicle body. In such instance, an intermediate draft tongue, indicated as an entirety by the numeral 50 as shown in FIGS. 1B, 4 and 5, is employed at the front end of the sulky vehicle to connect the structure of the sulky 52 with a tongue or drawbar 54 provided by a tractor or other draft vehicle.

The preferred embodiment of the intermediate hitch 50 comprises a weight-measuring member 60 having holes 62 therein at one end which allows the insertion of bolts 64. The hitch 50 is then rigidly connected to the sulky tongue 55 with the aid of bolts 64 and 64' and nuts 66 and 66'.

Rigidly affixed to the weight-measuring member 60 on the upper surface are strain gages 68 and 70, while gages 68' and 70' are rigidly mounted on the lower surface. The opposite end of member 60 has a smaller diameter and is rotatably mounted in housing 72 within bearings 74 and 74' and is held in position by tightening nut 76 onto the threaded end 77 of member 60.

Extending from the housing structure 72 is a clevis structure 78 comprising a pair of vertical plates having bores 80 and 80' for receiving mounting bearings 57 and 57' therein. Crossbar 59 has cylindrical end portions 63 and 63' rotatably mounted in said bearings 57 and 57'. Nuts 61 and 61' are secured to mating threaded portions 65 and 65' and hold crossbar 60 in place. A mounting hole 67 is provided in crossbar 59. The crossbar is secured to the clevis 54 of a tractor or other towing vehicle by means of a king pin 85 which fits through the hole in the tractor clevis 54 and the hole 67 in the hitch crossbar 59.

The purpose of the bearings 74, 74' in the hitch 50 is to prevent the application of unwanted torques or moments upon the sulky vehicle which may be imposed by the tractor if it is tilted with respect to the sulky., e.g., the wheels of the tractor and sulky not being in the same or parallel planes. When this occurs a twisting action takes place between the tractor clevis 54 and the hitch 50. If bearings 74 and 74' were not used a torsion shear stress would occur in the weight-measuring member 60 producing a false weight indication.

The strain gages 68 and 70 and 68' and 70' are disposed on the round weight-measuring member 60 in exactly the same manner and for the same reasons as previously explained for the axles. Bending moments in the weight-measuring member 60 are sensed and interpreted in the same manner as described for the axle device.

Figure 6:
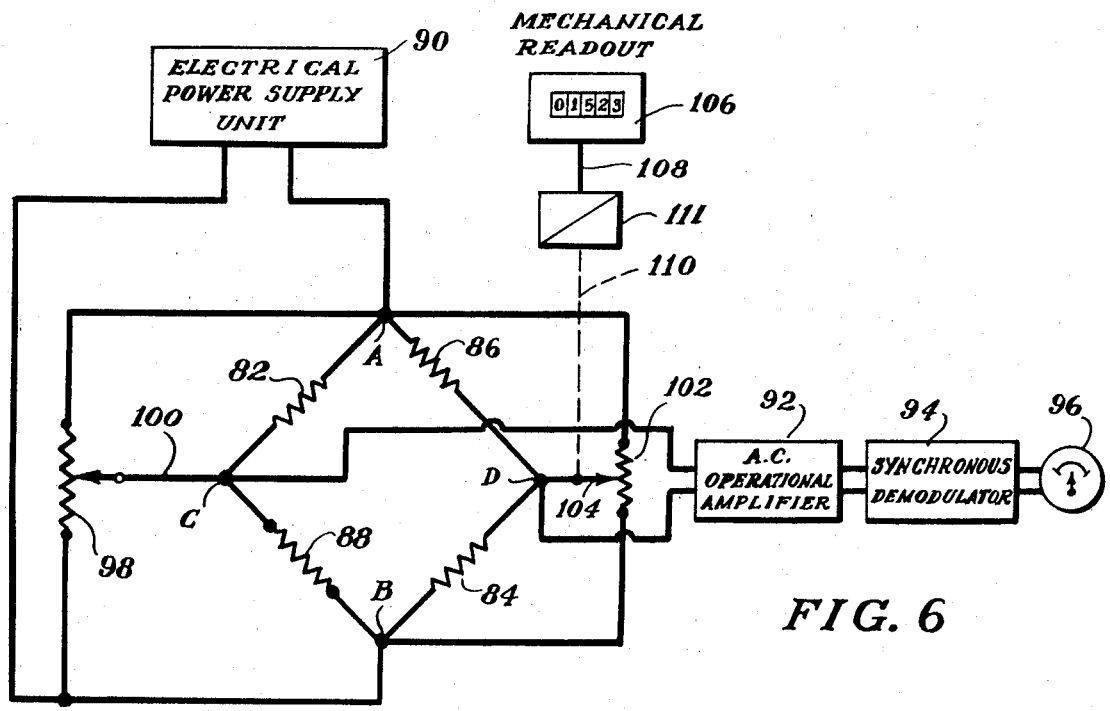
FIG. 6 is a schematic diagram of one embodiment of my electromechanical weight-measuring system.

Referring now to FIG. 6, in the bridge circuit a load-measuring transducer or sensor of the resistance type is employed. It is commonly known that the electrical resistance of this type of strain gage is increased when the gage is under tension and decreased when the gage is under longitudinal compression. A strain gage bonded to the top of a resonant or elastically, deformable cantilevered weight-supporting member, will be under increasing compression as the weight is increased and a strain gage bonded to the bottom of a deformable cantilevered weight-supporting member, will be under increasing compression as the weight is increased and a strain gage bonded to the bottom of a second deformable cantilevered weight-supporting member will be under increased tension as the weight is increased. For convenience hereafter, the strain gages subjected to compression as the load increases will be referred to as "compression gages" and the strain gages subjected to tension as the load increases will be referred to as "tension gages". The gages bonded to the left-hand deformable member will be referred to as "left" compression and tension gages and the gages bonded to the right-hand deformable member will be referred to as "right" compression and tension gages.

In describing the electrical connections, the four corners of the bridge circuit are respectively identified as points A, B, C and D. The diagram of FIG. 6 illustrates the electrical components of a system having two cantilevered weight-supporting members. The left compression gage 82 is connected between points A and C to form an arm of the bridge circuit and the right compression gage 84 is connected between points B and D to form the second arm of the bridge circuit opposite the first-mentioned arm. The right tension gage 86 is connected between points A and D to form a third arm of the bridge circuit and the left tension gage 88 is connected between points B and C to form a fourth arm of the bridge circuit opposite the third arm.

A source of alternating voltage is connected across points A and B of the bridge circuit which provides a potential difference between points A and B. In the present embodiment, the source of alternating voltage is obtained from the vehicle battery and is changed into an AC square wave by a conventional inverter circuit 90. In addition, secondary inverter outputs are rectified and filtered by conventional means and regulated by the use of zener diodes in a conventional manner to generate the auxiliary DC voltages. These voltages remain at a fixed value regardless of the battery potential, and are required for the operation of the AC operational amplifier. The DC to AC inverter 90 generates auxiliary square wave signals used for the synchronous demodulator, which will be explained later on. Points C and D of the bridge circuit are connected to an indicating means, after first being processed by an AC operational amplifier which amplifies the unbalanced AC signal appearing across these terminals. A perfectly balanced bridge will cause the AC operational amplifier to have zero output; therefore the indicating device 96 will have zero deflection and be centered on the scale. Any unbalance in the bridge circuit caused by changes in resistance of the strain gage elements will cause the AC operational amplifier 92 to have an output. This in turn is demodulated by the synchronous demodulator 94 and fed to the indicating device 96. The indicating device 96 may either be calibrated in pounds or any convenient measuring scale. However, in the present embodiment, the indicating device is reset to zero by mechanically balancing the bridge using an auxiliary readout device to indicate the weight of the material being measured. The ends of the resistance element of a first or bridge-balancing potentiometer 98 are connected to points A and B of the bridge circuit and the slider 100 of the potentiometer 98 is connected to point C of the bridge circuit. This potentiometer is used to balance the bridge under the initial or start condition and will automatically subtract the weight of the material-receiving media. The ends of the resistance element of the second or readout potentiometer 102 are connected to points A and B of the bridge circuit and the slider of the potentiometer 104 is connected to point D of the bridge circuit. A counter 106 is mechanically connected by rotation transmitting elements 108 and 110 between which is rotation multiplying device 111, such as a gear box. The rotation multiplying device 111 is arranged to rotate the shaft of the counter 106 to a greater angular displacement than that through which the shaft of the readout potentiometer 102 is adjustably rotated.

The bridge as diagrammed in FIG. 6 in the preferred embodiment is excited or energized by an AC voltage of 12 v. AC at 1,000 Hz. which is produced from an inverter 90 whose excitation in turn is derived from a DC source such as the vehicle storage battery or an auxiliary battery incorporated within the housing for the operational amplifier, demodulator, and indicating device, as well as the counter.

The electronic circuitry is all of the solid state type using a maximum of miniature integrated semiconductor modules.

Figure 7:
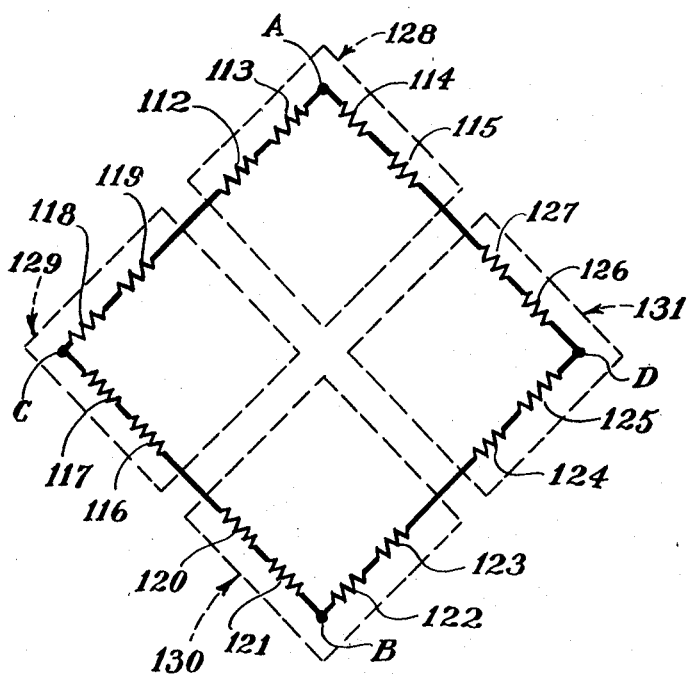
FIG. 7 is a schematic diagram of the measuring bridge circuit showing the incorporation of the necessary strain gage sensors to measure the weight of material in four load-bearing members.

FIG. 7 illustrates a modification of the bridge circuit utilized in FIG. 6, wherein four load-sensing gages have been incorporated. It is to be understood that four load-sensing gages need not be utilized. When less than four gages are utilized, a dummy resistance network is substituted to complete the bridge network, thereby enabling the bridge to be balanced. Additional load-sensing gages may be incorporated and connected in the proper manner in the respective arms of the bridge. Gages 112, 113, 114 and 115 are the four elements which would be utilized on one load-bearing member. These gages correspond to items 116, 117, 118 and 119, which are the load-sensing gages appearing on another load-bearing member. Similarly, gages 120, 121, 122, 123 would appear on an additional load-bearing member. Likewise, gages 124, 125, 126, 127 would appear on the fourth load-bearing member if the vehicle or stationary container were supported by four load-supporting members. It is to be pointed out again that if less than four load-supporting members are used, the only requirement is that a dummy sensing network be utilized to replace the gages not utilized.

Each axle of the vehicle, therefore, would contain the four gages encompassed in the dotted lines and numbered 128, 129, 130 and 131.

One method of calibrating the strain gages to be used in the load-carrying members of various vehicles is to vary the distance D2 between the gages when affixed to the load-bearing member and design the gages to have a predetermined resistance value. This enables one indicating device to be used for many different vehicles regardless of whether they are of the three or four load member bearing type, or whether they are fixed containers or vehicular-mounted containers. Each gage will have the same sensitivity regardless of tare weights.

This technique, therefore, will enable vehicles of different tare weights, which would cause different output readings on the various strain gages, to be adjustable to the correct output value. Thus the sensitivity of all strain gage sensors would be identical and the indicating device could be interchanged or used to measure the contents of various types of containers. All system components used in the bridge will have the same effective impedance thus avoiding the necessity for individually calibrating each system each time it is used.

OPERATION OF THE CIRCUIT

Some further explanation of the functions and characteristic of certain of the elements and components shown in circuit diagram, FIG. 6, are desirable here.

The balancing potentiometer 98 (manually settable) is used when it is desired to balance out the initial weight or some predetermined weight to obtain a zero reading on the counter 106.

The readout potentiometer 102 (manually settable) is used to obtain a null indication so that the counter, (preferably of the Veeder-Root or equivalent type) will indicate the weight on cyclometer-type dials or the equivalent.

Synchronous demodulator 94 converts an AC signal to a DC signal. The DC null indicator 96 may be an instrument such as a galvanometer.

The gear box 111 multiplies the angular displacements of the readout potentiometer shaft and its movement is directly related to the increase in weight of the material in the container. With the material-receiving medium empty, the readout potentiometer 98 is adjusted for the count on the readout 106 to be on zero, then the balancing potentiometer 98 is adjusted to bring the pointer of the null indicator 96 into alignment center, that is zero on the indicator scale. This operation balances out the weight of the receiving medium and all parts of the vehicle supported by members equipped with strain gages. The readout potentiometer 102 is then adjusted to cause the counter 106 to indicate the weight of material which the user wishes to place in the receiving medium. The null indicator will then have an indication other than zero. Material is then incrementally placed in the receiving medium until the null indicator shows a zero reading at which time the weight of the material in the receiving medium is, as indicated by the counter, a desired weight. A second and different material may be added by using either of the two following methods for operating the equipment, to wit:

METHOD 1

The readout potentiometer 102 is adjusted to indicate the combined weight of the originally deposited material plus the desired weight of the material to be added. The null indicator 96 will then display a reading other than zero. A second material is incrementally added until the null indicator presents a zero reading, at which time the desired weight of the second material will have been added. Similarly the desired weight of a third material may be added.

METHOD 2

The balancing potentiometer 98 is adjusted to obtain a zero reading on the null indicator 96 and the readout potentiometer 102 is then adjusted to cause the counter 106 to indicate the weight of the material to be added. The second material is incrementally added until the null indicator presents zero reading at which time the desired weight of the second material will have been added. Similarly the desired weight of a third material may be added.

A similar method may be used to determine the amount of material being expended from a container.

From the foregoing disclosure it will be seen that I have provided a new and improved electromechanical weighing system which is adapted for wide general use related to the support of various material-receiving media and preferably to a plurality of critical load points. It is applicable to bins and other storage receivers wherein solid and liquid materials are at intervals successively deposited and it is particularly applicable to material receivers mounted for travel on wheels, tracks, runners or other ground-engaging supporting means. My invention and novel concepts are of great value for application to receivers which are adapted to intimately admix predetermined quantities of different materials (solid, granular or liquid) and where said different materials are successively and at intervals deposited in the receiving medium.

It is also to be realized this system may be utilized for measuring the expenditure or disposition of materials in a container as well. It will further be seen that numerous types of vehicles supported by axles, or by the equivalent, and upon ground-engaging elements such as tracks, wheels, skids, or the like, replaceable axle and axle-support structures may be readily applied as a replacement for the original axle structure without requiring a change in wheels or other ground-engaging supporting elements, and without requiring reformation of the base or body material-receiving medium. It will be further seen that the system and method by which cumulative and successive weight information is derived is unique because of its great simplicity as contrasted with prior art devices. All of the components, electrical and mechanical, of my system with the exception of the pairs of strain gages which are bonded onto the cantilevered elements may be assembled very compactly in a small capsule mounted at any convenient point upon the material-receiving body or its frame, or may be remotely located if so desired.

What I claim as new and desire to secure by letters Patent is:

1. A system for electromechanically weighing loads reposing in a material-receiving container comprising:
   a. a cantilevered deformable elastic element supporting said container at its load point;
   b. a first pair of strain gages;
   c. a second pair of strain gages disposed in a horizontal spaced relation with said first pair of strain gages, one of each of said pairs of strain gages being affixed to the upper surface and the other of each of said pairs of strain gages being affixed to the lower surface on said cantilevered element, said upper and lower strain gages being mounted in juxtaposition,
   d. means for connecting said strain gages in the appropriate arms of a bridge circuit,
   e. means for supplying a substantially constant electrical energy to said bridge circuit,
   f. adjustable means for balancing said bridge circuit when there is no material load in said receiving container,
   g. means for indicating the balance condition of said bridge circuit, said indicating means having a scale calibrated in units of weight, whereby a load added to said material-receiving container causes said bridge circuit to become unbalanced and causes said indicating means to indicate the weight of the additional load, said means for indicating the balance condition of said bridge circuit comprising:
   h. a second adjustable means for balancing said bridge circuit when said material-receiving container contains a load, and
   i. a counting means connected with the movable portion of said second adjusting means to indicate the magnitude of the changed load.

2. The system set forth in claim 1 including means adapted to multiply the output of said second adjustable balancing means interposed between said movable portion of said second balancing means and said counting means.

3. The system set forth in claim 2 wherein said means for indicating the balance condition of said bridge comprises:
   a. a mechanical motion transmission means; and
   b. a mechanical counter.

4. In a system for electromechanically weighing loads reposing in a material-receiving container which is mounted for travel on a plurality of ground-engaging elements, the improvements in conjunction with each of said ground-engaging elements comprising:
   a. a readily affixable axle unit having means for a substantially rigid connection adjacent one end thereof with said receiving medium;
   b. extension axle means beyond said rigid connection constructed of metallic material of deformable but elastic characteristics and having an outer extension for assembly with its associated ground-engaging elements;
   c. a first pair of electrical resistance type strain gages affixed respectively to the top and bottom portions of said extension, disposed substantially in vertical alignment and located at the intermediate portion of each of said axle extension elements between said rigid connection and said ground-engaging elements;
   d. a second pair of electrical resistance type strain gages affixed respectively to the top and bottom portions of said extension in a substantially horizontal spaced relation with said first pair of strain gages disposed substantially in vertical alignment;
   e. means for electrically connecting said strain gages of said several axle units together to form a bridge circuit.
   f. an electrical, substantially constant power supply means connected to opposite corners of said bridge circuit;

g. a null-type indicating means connected to the remaining corners of said bridge circuit;

h. a first potentiometer for obtaining a balanced condition of said bridge circuit when there is no material-load in said receiving medium, and having the ends of its resistance element connected to the corners of the bridge circuit to which said power supply means is connected and having its slider element connected to one of the corners of the bridge circuit to which said null-type indicating means is connected;

i. a second readout potentiometer having the ends of its resistance element connected to the corners of the bridge circuit to which the power supply means is connected and having its slider connected to the second corner of the bridge circuit to which said indicating means is connected;

j. a mechanically actuated counter calibrated for indicating; and k. mechanical motion transmission means connected with the slider of said second potentiometer and said counter.

5. The system set forth in claims 4 wherein said indicating means, and power supply means in combination are adapted for use with multiple material-receiving containers.

6. The system set forth in claims 4 wherein provision is incorporated for selectively inserting a strain gage or a dummy load resistor.

7. The system set forth in claim 6 wherein said strain gages are adapted to have a predetermined resistance value.

8. The system for electromechanically weighing loads reposing in a material-receiving container which is mounted on at least one load point support, said system having in combination, for each of said load point supports:

a. a generally horizontal, elastic, weight-bendable member having one of its ends rigidly secured to said container and having upper and lower longitudinal surfaces, b. a primary upstanding support member connected in supporting relation with the other end of said elastic member, c. at least a pair of cooperating electrical strain gages affixed in a predetermined spaced relation upon one of said longitudinal surfaces of said elastic member between the ends thereof, d. means for connecting each of said strain gages to the appropriate arms of a common electrical bridge circuit; and in common with the foregoing components, said bridge circuit comprising, e. a null-type indicating means, f. a first potentiometer for obtaining a balanced condition of said bridge circuit when there is no material load in said container, g. a second readout potentiometer, and h. means responsive to the changes of said readout potentiometer and connected with said indicating means for measurably indicating changes effected by the weights of material deposited upon said container.

9. The structure and combination set forth in claim 8 and a second pair of predeterminately spaced strain gages affixed to the other of said longitudinal surfaces and appropriately electrically connected with arms of said electrical bridge circuit.

10. The system and combination set forth in claim 8 wherein said last-recited means comprises:

a. a mechanically actuated counter calibrated for indicating weight, and b. a mechanical motion transmission means connected with the slider element of said second potentiometer and with said counter.

11. The system and combination of elements set forth in claim 8 wherein:

said primary support members comprises ground-engaging elements of the class comprising wheels, tracks and runners.

12. A system for electromechanically weighing various loads carried in a material-receiving container which is mounted on a plurality of spaced, load point supports, each of said load point supports constituting an independent replaceable unit comprising:

a. an independent, elastic, weight-bendable axle having a first end rigidly secured to said container and a second end extending laterally from said container, b. an upright, ground-engaging support member connected with the second end of said axle and supporting the same, c. a load-supporting and fulcruming plate closely surrounding said axle at an area adjacent the first end thereof and rigidly secured to said container to exert force downwardly against said axle proportional to weight variations in said container, d. at least a pair of cooperating electrical strain gages affixed in predetermined spaced relation upon one of the upper or lower longitudinal surfaces of said elastic axle, between said fulcrum plate and said upright ground-engaging support, such strain gages having known parameters which vary in known manner in respect to varying deformation thereof as produced by weight variations transmitted by said fulcrum plate, e. said system requiring at least a pair of said load point support units to be opposed in spaced relation with their axles substantially aligned, and f. electrical measuring and indicating apparatus connected with the said strain gages of all of said elastic axles for detecting the load variations in known electrical parameters, and for indicating said variations in a measurement of weight.

13. A system and combination set forth in claim 12 wherein: the ground-engaging support members for said opposed pair of load point support units are constructed for travel over the ground and said pair of units are replaceable with the axle units and body attachment members of conventional load-carrying vehicles.

* * * * *